D. MOULD.
TIDAL MOTOR.
APPLICATION FILED DEC. 1, 1911.
1,195,386.
Patented Aug. 22, 1916.
2 SHEETS—SHEET 2.
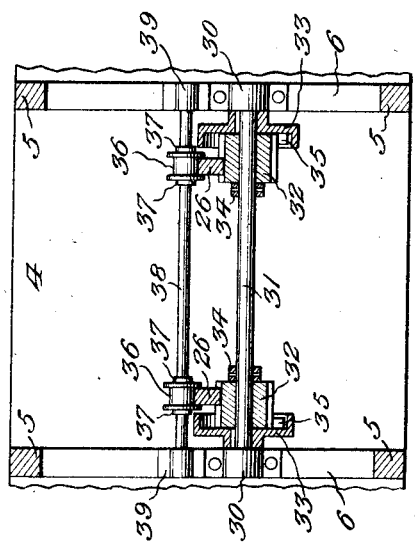
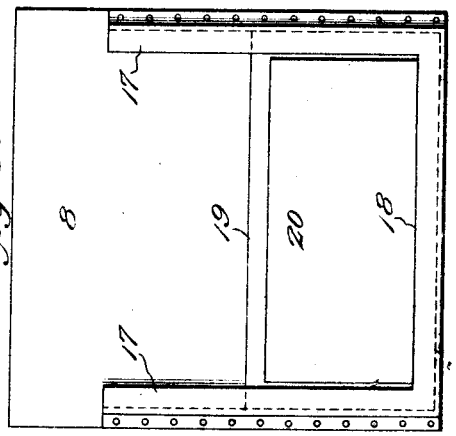
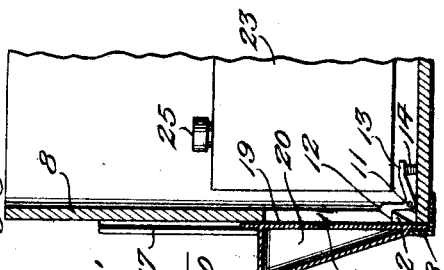
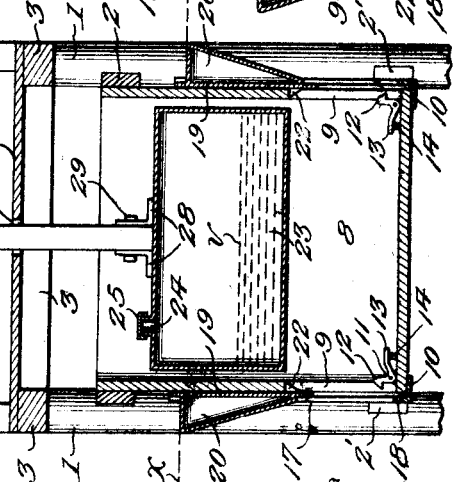
Witnesses
Edwin G. McKee
Annie I. Hind
Inventor
Daniel Mould
By Geo. W. Sues
Attorney

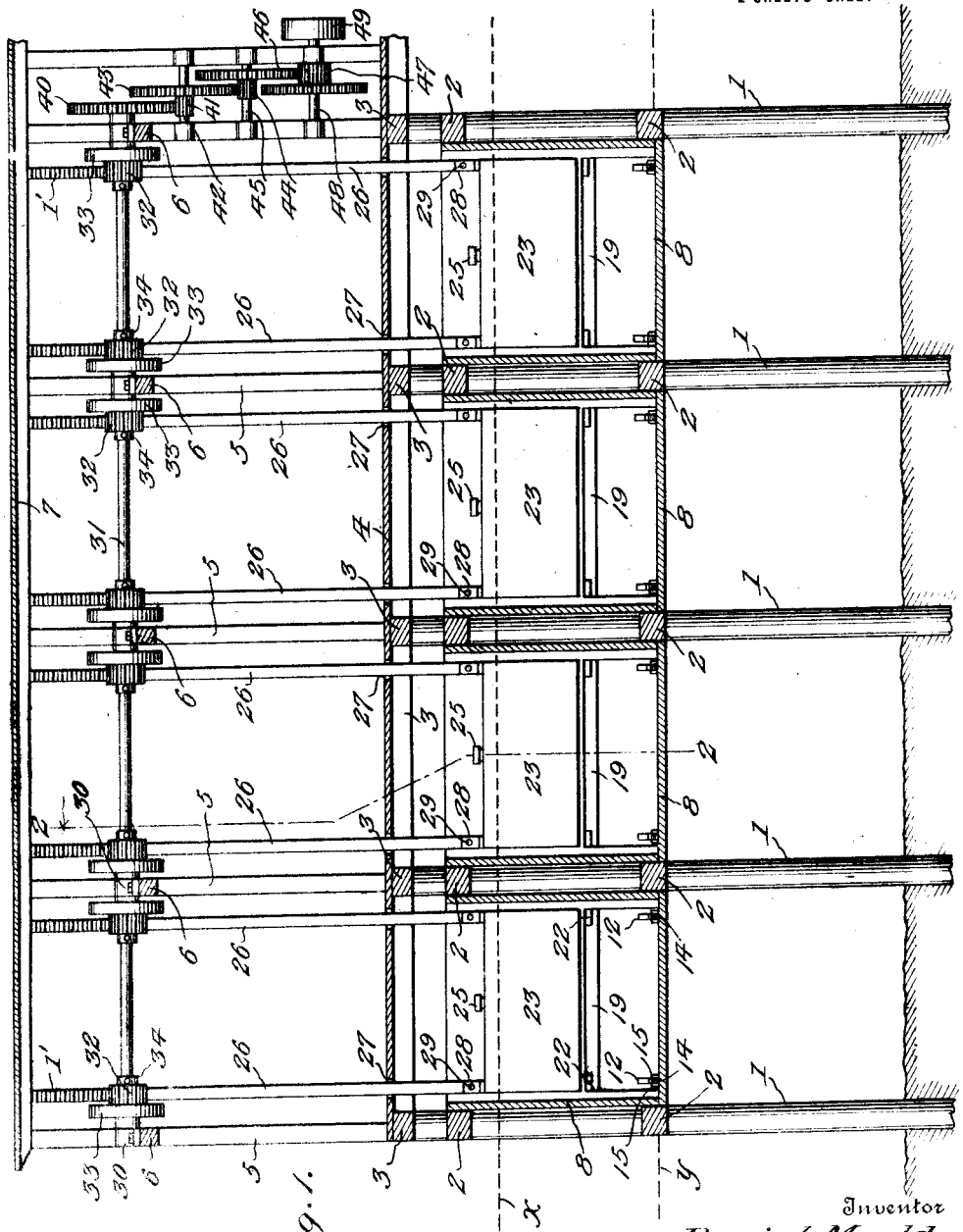

UNITED STATES PATENT OFFICE.

DANIEL MOULD, OF ULSTERVILLE, NEW YORK.

TIDAL MOTOR.

1,195,386.   Specification of Letters Patent.   Patented Aug. 22, 1916.

Application filed December 1, 1911.   Serial No. 663,336.

*To all whom it may concern:*

Be it known that I, DANIEL MOULD, a citizen of the United States, and a resident of Ulsterville, in the county of Ulster and State of New York, have invented certain new and useful Improvements in Tidal Motors, of which the following is a specification, reference being had to the accompanying drawings.

This invention has relation to certain new and useful improvements in tidal motors; and the object of my invention is to provide a motor of this general character, of a simple and inexpensive nature and of a compact and durable construction, which shall be capable of accurate adjustment in position below a pier to be periodically operated by the rising of the tide to actuate a weighted float, which on the ebb of the tide descends, the descending movement being applied or stored through suitable mechanisms.

With these and other objects in view the present invention consists in the combination and arrangement of parts as will be hereinafter more fully described and finally pointed out in the appended claims, it being further understood that changes in the specific structure shown and described may be made within the scope of the claims without departing from the spirit of the invention.

In the accompanying drawings forming a part of this specification and in which like numerals of reference indicate similar parts in the several views: Figure 1, shows a front elevational view partly in section, disclosing a battery of tidal motors constructed according to my invention. Fig. 2, is a section on line 2, 2, of Fig. 1. Fig. 3, is a section on line 3, 3, of Fig. 2. Fig. 4, shows an enlarged fragmentary view through one of the caissons. Fig. 5, shows a front view of one of the caissons, disclosing one of the gates as closed.

In my present invention I provide a motor which can be installed singly or in connected batteries below a pier in any tidal water.

In carrying out the aim of my invention I employ a caisson having a valve so that the caisson can be flooded at predetermined periods to raise a weighted float. As the tide recedes the float descends, rotating through the intermedium of a rack and gear, a shaft, the caisson valve automatically closing at the ebb of the tide to be opened by the descending float, permitting an inrush of water to again raise the float. The downward movement of the float is so timed that when it reaches the bottom the tide will be at flood and the gates will be released, permitting an inrush of water.

In the accompanying drawings the numeral 1, 1, represents suitable piles disposed in alined series, secured by means of suitable end beams 2, 2, and cross beams 2', 2', this construction being shown in Figs. 1 and 2. To the upper ends of the piles 1 are secured the floor beams 3, supporting the flooring 4. The flooring 4 gives support to the posts 5, 5, which in turn support the roof 7. As shown in Fig. 3, the posts 5 at their upper ends are braced by means of the beams 6.

For the purposes of my invention, the piles are disposed in sets of fours and are braced by the timbers 2, 2', these timbers and the piles supporting a suitable, preferably, rectangular caisson 8. Each caisson near the lower end and at opposite sides, as shown in Fig. 2, is provided with the openings 9. The caissons are secured below by means of the angle irons 10, shown in Fig. 2, which are suitably secured to the lower timbers 2'.

Disposed in sets of twos, proximal to the openings 9, are suitable detents, each detent being pivotally held upon a pin 11 and having an outstanding beak 12 and a rearwardly extending lever 13, a suitable coil spring 14 being interposed between the levers 13 and the bottom of the caisson, as shown in Fig. 4. The pins 11 are carried by means of suitable ears 15, these ears being more clearly shown in Fig. 1.

Secured exteriorly to each caisson in parallel spaced relation are the vertically disposed flanges 17, connected below, as shown in Fig. 5, by means of the bottom flange 18, and working within these flanges are the rectangular gates 19, each gate exteriorly being provided with a hollow chamber 20, this construction being more clearly shown in Fig. 4. Each gate 19 at suitable points upon the rear is provided with two angular shoulders 22, these shoulders being arranged for coaction with the beak hooks 12, being arranged to lock below the same in one of their positions, as shown in Fig. 4. These shoulders 22 perform a further function, in that they serve as stops limiting the upward movement of the gates, as shown for instance in Fig. 2, where the two gates 19 are shown in their raised position, the flood of the tide being indicated by the letter $x$. As shown in said figure, the ears 22 are stopped below the edge of the caisson openings.

In Fig. 1 is shown a battery of four caissons and within each caisson is a float 23, each float preferably comprising a steel housing having an aperture 24 closed by means of a cap 25. By means of these apertures 24, the floats can be filled with water so that they can be exactly weighted, the caps 25 serving to prevent any egress or ingress of water after the float has been charged.

Secured near each end of each float are the upstanding rack bars 26, these rack bars extending through suitable openings 27 within the floor of the pier, as shown in Figs. 1 and 2. These rack bars 26 are secured to the flanges 28, fixed to the top of the floats and are held by means of suitable bolts 29. As shown in Fig. 1, the rack bars are positioned near opposite ends of the floats.

In referring to Figs. 2 and 4, it will be noticed that the outstanding levers 13 of the detents are located in the path of the floats 23, so that as these floats descend, they engage the spring actuated detents, causing a release of the float actuated gates 19.

Secured to the beams 6, as shown in Figs. 1 and 3, are the bearings 30, and held within these bearings is the drive shaft 31. Held upon the drive shaft 31 are the rack gears 32, these gears being held at one end against the faces of the pawl plates 33, and at the opposite end against the collars 34. As shown in Fig. 2, the pawl plates 33 are provided with suitable pivot pins 34', upon which are held the spring actuated pawls 35, these pawls being arranged to contact with the rack gears 32. The gears 32 are also in mesh with the teeth 1' of the rack bars 26, as shown in Figs. 2 and 3. The pawl disks 33 are keyed to the shaft 31, while the rack gears 32 loosely revolve upon the shaft 31.

In order to normally hold the rack bars 26 in engagement with the gears 32, I employ the grooved sheaves 36, rotating between suitable collars 37, held upon a shaft 38, secured within suitable bearings 39, this construction being clearly shown in Fig. 3.

At one end, as shown in Fig. 1, the shaft 31 is provided with a gear 40, this gear meshing with the pinion 41 carried upon a shaft 42, this shaft also having secured to it the gear 43, in turn meshing with the pinion 44 secured to a shaft 45, which shaft in turn has secured to it, the gear 46 meshing with the pinion 47 upon a suitable shaft 48, provided with the drive pulley 49.

My tidal motors may be arranged singly or in batteries.

The operation of my motor is as follows:

The caissons 8 are so positioned that their bottoms extend approximately on a line marking low tide. In Fig. 1 the low tide line is marked $y$. The upper ends of the caissons are arranged to extend above the high water mark and in said Fig. 1, as well as in Fig. 2, the line indicating the high water mark is indicated at $x$.

Upon installing the caissons properly secured between suitable piles, the gates 19 are closed, in which position the detents 12 lock over the shoulders 22 to hold these gates in locked position. As shown, especially in Fig. 4, each gate 19 is provided with an air chamber 20, this chamber being of a buoyant capacity sufficient to promptly raise the connected gate when the gate is submerged.

In the operation of the device the gates would be kept closed until the flood of the tide. The floats 23 would then be released and as they descended each rack 26 would rotate its connected gear 32, the combined gears rotating the drive shaft 31. The floats 23 would be weighted, preferably by water, and in Fig. 2 the float 23 is shown as weighted with water up to the line $y$. The train of gearing 43, 46 and 47 would be so timed that the tide would ebb and flow by the time the float arrived at the bottom of the caisson. As the float 23 finally reaches the bottom of the caisson, it will encounter the extending lever 13 of the detents 12, causing the gates 19 to be released. The air chambers 20 secured to the gates 19 would then instantly carry the gates upward, permitting a free inrush of water, which would result in the floats being promptly carried upward. This upward movement of rack 26 would be possible, as in rising, the gears 32 ride dead below the pawls 35. As the tide recedes, the weighted floats will gradually descend. As has been stated, however, the downward movement of the floats 23 is very much slower than the movement of the tide, so that by the time the floats arrive at their lowermost position, the tide will again have risen to the high water mark. As the tide recedes, the float carried gates of course descend, and at the ebb of the tide are locked by means of the detents 12.

From the foregoing it will be noticed that the floats are periodically actuated and that they in their downward movement operate a shaft, the movement imparted to which is stored through any suitable mechanical means.

A tidal motor constructed according to my invention is simple in construction and both durable and efficient in operation, and can be readily placed in position.

Having thus described my said invention, what I claim as new and desire to secure by United States Letters Patent is:

1. In combination, a caisson, a gate within said caisson, a detent to hold said gate in locked condition, a float secured to said gate to raise the same, a float within said caisson, a rack bar extending from said float, a shaft revolubly secured above said float, and a gear wheel in pawl and ratchet engagement with the shaft and meshing with said rack bar, said float arranged to contact with said detent to release said gate, as and for the purpose set forth.

2. The combination in a device of the character described, of a caisson, a gate within said caisson, a detent to hold said gate in locked condition, a float secured to said gate to raise the same, a stop limiting the upward movement of said gate, a float within said caisson said detent being located within the path of said float, a rack bar extending from said float, a shaft revolubly secured above said float, and a gear wheel in pawl and ratchet engagement with said shaft and meshing with said rack bar, all arranged substantially as and for the purpose set forth.

3. The combination in a device of the character described, of a caisson, a gate within said caisson, a detent to hold said gate in a locked condition, a float secured to said gate to raise the same, a stop limiting the upward movement of said gate and arranged for co-action with said detent, a float within said caisson having an intake opening, a cap closing said opening, a rack bar extending from said float, a shaft revolubly secured above said float, and a gear wheel in pawl and ratchet engagement with said shaft and meshing with said rack bar, said float arranged to contact with said detent to release said gate, as and for the purpose set forth.

4. The combination in a tidal motor of the following instrumentalities to wit, a caisson having openings near the lower end, the bottom of said caisson reaching the low water mark, said caisson extending above high water mark, flanges skirting the vertical and lower edges of said openings, gates slidably held to said caisson by means of said flanges, a float secured to each gate, a shoulder serving as a stop secured to each gate, oppositely positioned detents secured to the bottom of said caisson one detent arranged for co-action with each of said shoulders, a spring to normally force said detents in one direction, a float within said caisson said detents being located within the path of said float, a rack bar extending upward from said float, a suitably positioned drive shaft, a gear wheel loosely held to said drive shaft, a disk keyed to said drive shaft adjacent to said gear, and a spring actuated pawl carried by said disk and engaging said gear said rack bar meshing with said gear.

5. The combination in a tidal motor of the following instrumentalities to wit, a caisson having openings near the lower end, the bottom of said caisson reaching the low water mark, said caisson extending above high water mark, said caisson being provided with flanges skirting the vertical and lower edges of said openings, gates slidably held to said caisson by means of said flanges, a float secured to each gate, a shoulder serving as a stop secured to each gate, oppositely positioned detents secured to the bottom of said caisson one detent arranged for co-action with each of said shoulders, a spring to normally force said detents in one direction, a float within said caisson said detents being located within the path of said float, a rack bar extending upward from said float, a suitably positioned drive shaft, a gear wheel loosely held to said drive shaft, a disk keyed to said drive shaft adjacent to said gear, a spring actuated pawl carried by said disk and engaging said gear, said rack bar meshing with said gear, and means to hold said rack bar to said gear.

6. The combination in a tidal motor of the following instrumentalities to wit, a caisson having openings near the lower end, the bottom of said caisson reaching the low water mark, said caisson extending above high water mark, said caisson being provided with flanges skirting the vertical and lower edges of said openings, gates slidably held to said caisson by means of said flanges, a float secured to each gate, a shoulder serving as a stop secured to each gate, oppositely positioned detents secured to the bottom of said caisson one detent arranged for co-action with each of said shoulders, a spring to normally force said detents in one direction, a float within said caisson said detents being located within the path of said float, a rack bar extending upward from said float, a suitably positioned drive shaft, a gear wheel loosely held to said drive shaft, a disk keyed to said drive shaft adjacent to said gear, a spring actuated pawl carried by said disk and engaging said gear said rack bar meshing with said gear, a rod held proximal to said rack bar, and a sheave upon said rod engaging said rack bar to hold said rack bar in mesh with said gear.

7. A tidal motor having in combination, a caisson with its bottom on a line marking low tide, the top of said caisson extending above high water mark, an opening being provided at the bottom of said caisson, a sliding gate closing said opening, a float secured to said gate, a stop shoulder extending inwardly from said gate, a detent having a beak hook arranged to engage said shoulder, a spring to normally hold said detent in operative position with its beak in the path of said shoulder, a float within said caisson, a rack bar extending from said float said detent being in the path of said float, a shaft above said caisson, a gear loosely held upon said shaft, a disk secured to said shaft, a spring actuated pawl carried by said disk engaging said gear, a drive gear secured to said shaft, and a train of gearing in mesh with said drive gear, said shaft being operated on the downward movement of said rack bar, the movement of said train of gearing being so timed that the descent of said float is controlled and moves half as fast as the tide so that when said float reaches its lowermost position the tide will be at flood.

8. In combination, a caisson, a gate within said caisson, a detent to hold said gate in locked condition, a float secured to said gate to raise the same, and a float within said caisson to actuate said detent.

9. In combination, a casing, a gate within said casing, a detent to hold said gate in locked condition, a float secured to said gate to raise the same, a float within said casing to actuate said detent, and a power mechanism actuated by said last mentioned float, as and in the manner set forth.

In testimony whereof I affix my signature, in presence of two witnesses.

DANIEL MOULD.

Witnesses:
 ANNIE I. HIND,
 GEORGE W. SUES.